United States Patent [19]

Purdham et al.

[11] Patent Number: 5,450,426
[45] Date of Patent: Sep. 12, 1995

[54] CONTINUOUS ERROR DETECTION USING DUPLICATE CORE MEMORY CELLS

[75] Inventors: David M. Purdham, Brooklyn Park; David C. Johnson, Roseville, both of Minn.

[73] Assignee: Unisys Corporation, Blue Bell, Pa.

[21] Appl. No.: 993,122

[22] Filed: Dec. 18, 1992

[51] Int. Cl.[6] .................. G11C 7/00; G11C 29/00; G06F 7/02; H04L 1/00
[52] U.S. Cl. .................. 371/68.1; 371/21.2; 371/67.1; 365/201
[58] Field of Search .............. 371/68.1, 67.1, 21.1, 371/21.2; 365/201, 189.07; 364/246.7, 246.6, 265.3, 268.5, 268.3, 944.2

[56] References Cited

U.S. PATENT DOCUMENTS

| | | | |
|---|---|---|---|
| 4,393,475 | 7/1983 | Kitagawa et al. | 365/201 |
| 4,615,030 | 9/1986 | Kumagai | 371/71 |
| 4,835,458 | 5/1989 | Kim | 324/73 |
| 4,897,817 | 1/1990 | Katanosaka | 365/201 |
| 5,060,230 | 10/1991 | Arimoto et al. | 371/21.2 |
| 5,132,937 | 7/1992 | Tuda et al. | 365/201 |
| 5,168,468 | 12/1992 | Magome et al. | 365/200 |
| 5,185,722 | 2/1993 | Ota et al. | 371/21.1 |
| 5,258,958 | 11/1993 | Iwahashi et al. | 365/210 |
| 5,305,261 | 4/1994 | Furutani et al. | 365/207 |

OTHER PUBLICATIONS

Clinton Kuo et al., Soft-Defect Detection (SDD) Technique for a High-Reliability CMOS SRAM, IEEE Journal of Solid-state Circuits, vol. 25, No. 1, Feb., 1990.

*Primary Examiner*—Robert W. Beausoliel, Jr.
*Assistant Examiner*—T. Tu
*Attorney, Agent, or Firm*—Nawrocki, Rooney & Sivertson

[57] ABSTRACT

A method of and apparatus for continuously checking a CMOS SRAM memory system. Each memory cell has a bistable circuit for retaining the state of the cell, along with a totally redundant bistable circuit. Added circuitry provides continuous comparing of the binary state of the bistable circuit and the redundant bistable circuit within the memory cell. This testing is performed at a low level within the memory cell eliminating the power dissipation and size requirements associated with additional drivers. An error line is shared amongst a number of memory cells. By continuously monitoring in this manner, the time of failure as well as the fact of failure can be determined.

2 Claims, 3 Drawing Sheets

CONTINUOUS ERROR DETECTION USING DUPLICATE CORE MEMORY CELLS

CROSS REFERENCE TO CO-PENDING APPLICATIONS

U.S. patent application Ser. No. 07/978,128, filed Nov. 18, 1992, entitled "IMPROVING CMOS STATIC RAM TESTABILITY" and U.S. patent application Ser. No. 07/978,093, filed Nov. 17, 1992, entitled "CONTINUOUS EMBEDDED PARITY CHECKING FOR ERROR DETECTION IN MEMORY STRUCTURES" are commonly assigned and are incorporated herein by reference.

BACKGROUND OF THE INVENTION

1. Field of the Invention

The present invention generally relates to memory storage subsystems and more particularly relates to error detection techniques for digital memory.

2. Description of the Prior Art

The earliest large capacity memories for digital computers were electromechanical devices, such as magnetic storage drums. Because these were not truly random access devices and the average access time was so large, these were readily replaced with static magnetic memories. The most popular of these utilized small magnetic cores wherein each data bit was stored in the magnetic polarization of a different one of a large, array of magnetic cores.

Magnetic memories have in large measure been replaced by monolithic semiconductors employing digital electronic circuits which store the data. In its simplest form, each data bit is stored in a different one of a large array of separate bistable circuits. Because accesses to semiconductor memories are completely electronic, they tend to have a very favorable cycle time when compared with magnetic memories. Historically, the major disadvantage of semiconductor memories was cost. However, current semiconductor fabrication technologies have made semiconductor memories extremely cost competitive.

Bipolar semiconductors provide the fastest memory devices. However, the much lower power dissipation of metal oxide semiconductors (i.e. MOS) has tended to make them the preferred choice for most general applications. The MOS technology requiring the least quiescent power (i.e. power required to maintain a static state when not switching) is complementary symmetry MOS (i.e. CMOS). This power saving becomes most prominent for large scale memories, as they tend to have a relatively larger number of cells in a quiescent state at any given time.

Currently, an extremely popular semiconductor memory architecture is the CMOS Static Random Access Memory (i.e. SRAM). The CMOS SRAM employs a complementary semiconductor pair as the basic storage element. In four transistor (i.e. 4T) CMOS SRAM cells, resistors are used to pull up the transistors of the bistable to the current source. The somewhat newer 6T cells employ two transistors rather than two resistors to provide the pull up function. A primary advantage of the 6T cells is that it is easier to fabricate pull up transistors than pull up resistors in a high density environment, particularly if random logic fabrication is also required.

All memory systems require two basic types of testing. The first such test type is functional. This is accomplished by writing known data into the memory and subsequently reading from the memory to see that the stored data is as expected. For most prior art memory systems, such testing is virtually the same. This is the case, because the memory function tends to be the same without regard to the actual storage technology.

The second test type is tailored to the specific memory technology employed. These tailored tests are needed because the failure modes of the different memory technologies are different. Kuo et al. discuss a tailored test methodology for 6T CMOS SRAM cells in "Soft-Defect Detection (SDD) Technique for a High-Reliability CMOS SRAM" IEEE Journal of Solid-State Circuits, Volume 25, No. 1, February 1990.

A primary disadvantage of most of these prior art testing techniques is that they preclude other system uses of the memory during the testing process. This results in an effective reduction in memory availability or memory bandwidth. This is particularly true in the Kuo et al. approach which performs circuit testing on each cell. Though various software and system techniques have been attempted which minimize this negative impact, the basic problem continues to exist.

An alternative and/or adjunct to memory testing is error correction. This approach does not impede memory availability or bandwidth, because it does not act until a failure has actually occurred. Perhaps the most prominent error detection technique involves voting of data actually read from the memory. In this approach, completely redundant storage is employed. When both copies of the data are read during a memory access, errors may be detected by comparing the redundant data elements. Multiple redundant storage elements are employed to permit data recovery for high reliability applications. As with error correction techniques generally, voting does not test the memory for suitability of future use but rather attempts to mitigate the negative effects of a failure which has already occurred. Furthermore, most voting schemes do not perform data checking until a given data element is referenced.

SUMMARY OF THE INVENTION

The present invention overcomes the disadvantages of the prior art by providing an apparatus and method for testing of a memory storage system without a corresponding negative impact on the availability or effective bandwidth of the memory system. Yet the testing occurs in advance of the criticality of failure detection.

The system employs redundant bistable circuits for the storage of each data bit. Any write function, which changes the state of a given memory cell, changes the state of both of the corresponding bistable circuits. The states of the two bistable circuits of each memory cell are continuously compared. Any lack of correspondence means that a malfunction has just occurred within the associated memory cell. In the preferred embodiment, the comparison circuits of all cells are wire-ored to a single error line.

Though the complexity of a semiconductor memory cell is increased to practice the present invention by the addition of the second bistable circuit, the overall power dissipation is only increased by the quiescent leakage of the second bistable circuit because there is no separate addressing or readout circuitry for the redundant bistable circuit. Most significant in this regard is that, except for the single error line for the entire memory system, no additional drivers are required because the testing occurs directly within each individual memory cell.

The present invention provides for continuous testing of each memory cell. Therefore, not only the fact of a malfunction can be noted, but also the time at which the failure occurred. This feature is deemed important for endurance/reliability testing. Unlike the prior art testing systems which require an access to a memory cell to determine that a failure has occurred, the present invention provides notification of a failure even though the associated memory cell is never accessed.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
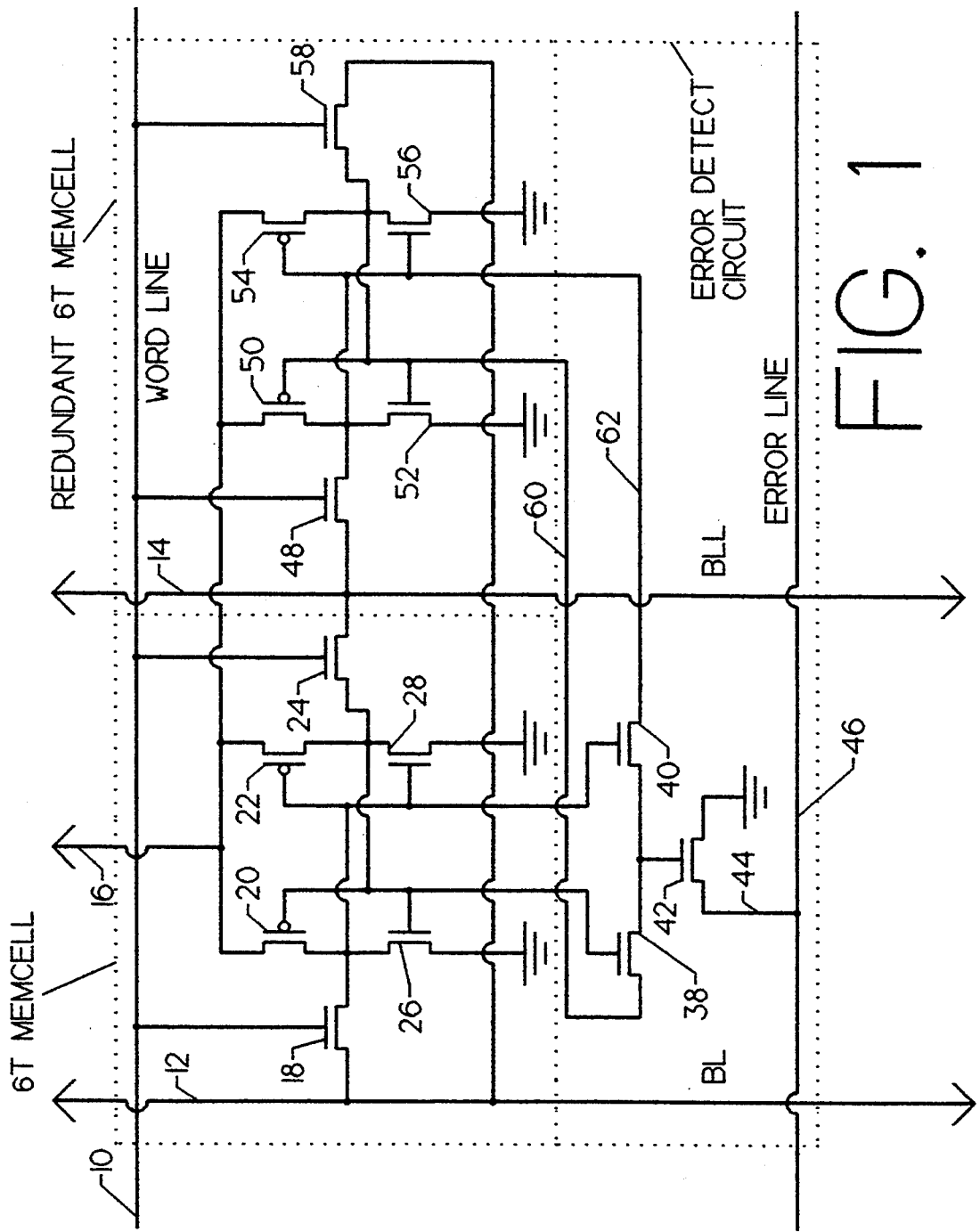
FIG. 1 is an electrical schematic diagram of a single 6T cell modified to practice the preferred mode of the present invention.

FIG. 1 is an electrical schematic diagram of a single 6T CMOS SRAM cell modified in accordance with the present invention. The prior art portion of the 6T cell comprises transistors 18, 20, 22, 24, 26, and 28, along with related interconnection circuitry.

Lines 12 and 14 are the bit line and complementary bit line, respectively. These lines couple to all of the individual cells within the memory system which are located at the same bit position as the cell shown. To enhance performance, lines 12 and 14 would ordinarily be precharged by a separate circuit (not shown). During write operations, lines 12 and 14 source and sink (or sink and source) current as an indication of the desired state of the bit to be written into the addressed cell. For read operations, the cell sources and sinks (or sinks and sources) current from lines 12 and 14 to indicate the state of the bit stored within the cell.

Addressing is provided by word line 10, which gates the addressed cell onto lines 12 and 14 via transistors 18 and 24. Thus a signal on line 10 indicates that the cell shown, along with all other cells within the same parallel data set (i.e. byte, word, etc.), are to be read from or written into. The addressing signal is generated using known circuitry by decoding the user access request. Because only one cell per column can be addressed, lines 12 and 14 are coupled to but one cell at a time via transistors 18 and 24.

Storage of a data bit within the cell is accomplished by setting the states of bistable transistors 26 and 28 and complementary transistors 20 and 22. This stored bit may then be read by examining the states of bistable transistors 26 and 28, along with complementary transistors 20 and 22. The complementary transistor pair 20 and 26 provides a path between current source 16 and ground. Transistors 22 and 28 provide a similar, parallel path. However, because transistors 20 and 26 and transistors 22 and 28 assume complementary states, the total quiescent current of the cell is only that associated with normal leakage. Because bistable transistors 26 and 28 and complementary bistable transistors 20 and 22 assume opposite states, the state of transistors 26 and 22 is the same, and the state of transistors 20 and 28 is the same.

According to the preferred mode of the present invention, the basic 6T memory cell circuit described above has a corresponding redundant 6T circuit comprising transistors 48, 50, 52, 54, 56, and 58. Transistor 54 of the redundant circuit corresponds to transistor 20 of the basic circuit. Similarly, transistors 56, 50, 52, 58, and 48 correspond to transistors 26, 22, 28, 18, and 24, respectively, of the basic 6T memory cell circuit. Thus in proper operation, the redundant 6T memory cell circuit functions as the mirror image of the basic 6T memory cell circuit.

The state of the redundant 6T memory cell circuit is modified and read as addressed using word line 10 in the same fashion as the basic 6T memory cell circuit. Transistors 48 and 58 couple transistors 50, 52, 54, and 56 to bit line 12 and complementary bit line 14 in the manner discussed above. Whenever both the basic and redundant 6T memory cell circuits are operating properly, all read and write functions are indistinguishable from the prior art memory systems.

Lines 60 and 62 provide the state of the redundant 6T memory cell circuit to permit transistors 38 and 40 to constantly compare the states of the basic and redundant 6T memory cell circuits. Whenever the states do not agree, transistor 42 is switched on to pull error line 46 to ground. To minimize drive circuitry and additional pins, error line 46 may be utilized by all of the memory cells in the memory system to indicate and error. Alternatively, if the added power dissipation and additional complexity are acceptable, each row and each column may have a separate error line to permit identification of the individual malfunctioning memory cell.

Figure 2:
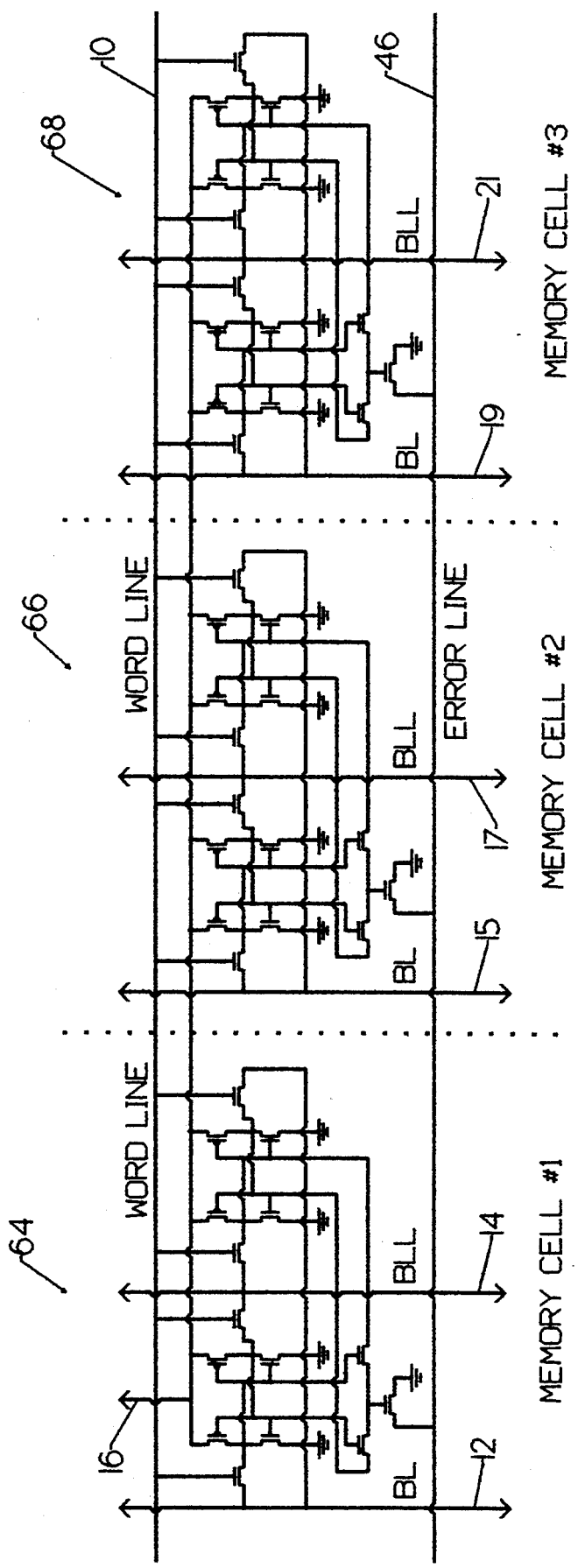
FIG. 2 is an electrical schematic diagram of multiple cells along a single word line employing the present invention.

FIG. 2 is an electrical schematic diagram of a three cell array employing continuous memory cell checking in accordance with the preferred mode of the present invention. The three cells shown are all addressed by word line 10 providing a three-bit parallel data structure. This three-bit data structure is shown as a matter of convenience. However, those of skill in the art will readily appreciate that parallel data structures of other configurations may be easily implemented. Cell 64, cell 66, and cell 68 comprise the three cell array.

Error line 46 runs parallel to word line 10 to provide an error indication which is shared for the entire row. Individual rows may have separate error lines or may share error line 46.

Figure 3:
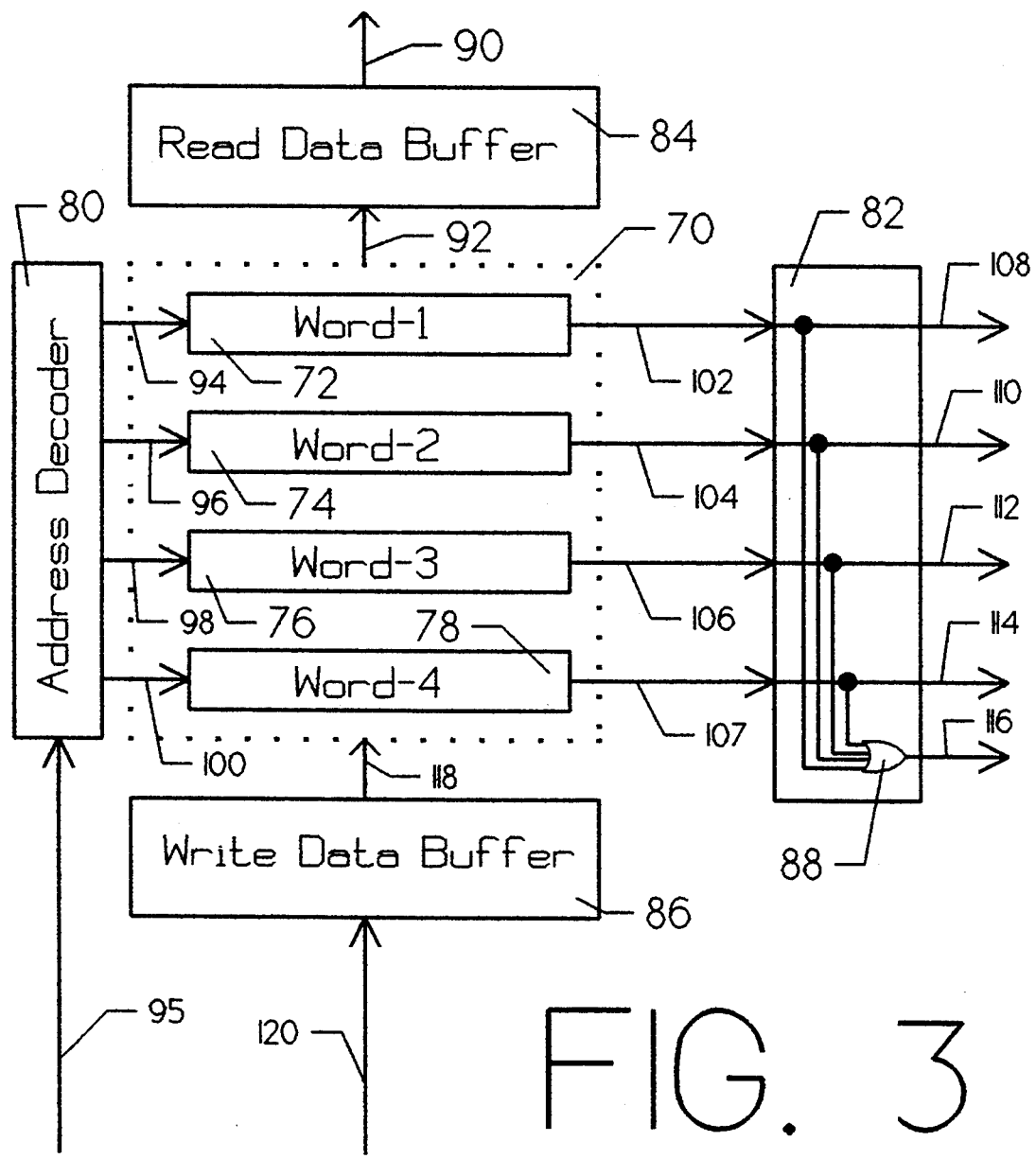
FIG. 3 is a basic block diagram of a multiword memory system.

FIG. 3 is a block diagram of a four word memory array. A separate error line is shown for each word for clarity. The user supplies an address via address input 95. Address decoder 80 decodes this address into an enable on one of word lines 94, 96, 98, or 100. In the present example, address line 95 would contain a two bit value wherein 00 is decoded as an enable on line 94, 01 results in an enable on line 96, 10 produces an enable on line 98, and 11 is decoded to produce an enable on line 100. Each of these word lines is similar to word line 10 (see also FIG. 1 and FIG. 2).

Memory array 70 consists of words 72, 74, 76, and 78, wherein each word comprises a number of individual cells coupled as shown in FIG. 2. The individual cells of the addressed one of words 72, 74, 76, and 78 are coupled to the bit lines for each bit position. For memory write functions, the parallel data is transferred via line 120 to write data buffer 86, from which it is applied to the bit and complementary bit lines (see also FIG. 1) via write interface 118. Similarly, read functions couple the addressed cells to the bit and complementary bit lines for transfer of the data to read data buffer 84 via read interface 92. The read data is provided to the user via read data output 90.

Each individual memory cell of the system is continuously checked in accordance with the present invention (see also FIG. 2) for each of words 72, 74, 76, and 78. Line 102 is the error line for word 72 and reports an error in word 72. Similarly, lines 104, 106, and 107 report errors in words 74, 76, and 78, respectively. All error reports are received by error output circuit 82, which can time tag error reports and/or provide error correction using column checking circuitry (not shown). Error output circuit 82 also provides the means to disable error reports during write transients. Most simply implemented, this function merely requires that errors be present for a minimum period of time before being assumed to represent an actual failure. This is easily provided by a multivibrator circuit.

Lines 108, 110, 112, and 114 provide system level reports of the detected error. Or-gate 88 provides and indication of an error in memory array 70 via line 116. As can be readily seen by those of skill in the art, the present invention may be utilized for continuous reporting of errors at the system level, within a given column or bit position, within a word, or even at the individual memory cell level.

Having thus described the preferred mode of the present invention, those of skill in the art will be capable of applying the teachings found herein to yet other embodiments within the scope of the claims hereto attached.

We claim:

1. An electrical apparatus for detecting errors in a memory device wherein a read operation and a write operation are performed therein, comprising:

a. a bistable circuit having a first inverter and a second inverter coupled together in a cross coupled configuration wherein an output terminal of said first inverter is a first output terminal and an output terminal of said second inverter is a second output terminal, said bistable circuit storing a first data bit having a first state such that said first state is imposed on said first output terminal and the inverse of said first state is imposed on said second output terminal;

b. a wordline;

c. a first transistor having a source port, a drain port and a gate port wherein said drain port of said first transistor is coupled to said first output terminal of said bistable circuit and wherein said gate port of said first transistor is coupled to said wordline;

d. a second transistor having a source port, a drain port and a gate port wherein said drain port of said second transistor is coupled to said second output terminal of said bistable circuit and wherein said gate port of said second transistor is coupled to said wordline;

e. a redundant bistable circuit comprising a third inverter and a fourth inverter coupled together in a cross coupled configuration wherein an output terminal of said third inverter is a third output terminal and an output terminal of said fourth inverter is a fourth output terminal, said redundant bistable circuit storing a second data bit having a second state such that said second state is imposed on said fourth output terminal and the inverse of said state is imposed on said third output terminal, said first state having a predetermined relationship with said second state, an error existing if said first state is different from said second state;

f. a third transistor having a source port, a drain port and a gate port wherein said drain port of said third transistor is coupled to said third output terminal of said redundant bistable circuit and wherein said gate port of said third transistor is coupled to said wordline;

g. a fourth transistor having a source port, a drain port and a gate port wherein said drain port of said fourth transistor is coupled to said fourth output terminal of said redundant bistable circuit and wherein said gate port of said fourth transistor is coupled to said wordline;

h. a first bit line coupled to said source port of said first transistor and further coupled to said source port of said fourth transistor;

i. a second bit line coupled to said source port of said second transistor and further coupled to said source port of said third transistor; a write data state are imposed on said first bit line and an inverse of said write data state are imposed on said second bit line and said word line are asserted thereby enabling said first, second, third, and fourth transistors thereby performing the write operation on said bistable circuit and said redundant bistable circuit; the read operation of said first and said second bistable circuits are performed by asserting said word line and sensing the state imposed by said bistable circuit and said redundant bistable circuit on said first and said second bit lines;

j. a first error detect transistor having a source port, a drain port, and a gate port wherein said drain port of said first error detect transistor is coupled to said fourth output terminal of said redundant bistable circuit and wherein said gate input port of said first error detect transistor is coupled to said second output terminal of said bistable circuit such that said first error detect transistor continuously monitors the inverse of said first state stored in said bistable circuit and said second state stored in said redundant bistable circuit and asserts said source port of a second error detect transistor if equality is detected, regardless of whether the read operation, the write operation, or neither is currently being performed;

k. said second error detect transistor having a source port, a drain port, and a gate port wherein said drain port of said second error detect transistor is coupled to said third output terminal of said redundant bistable circuit and wherein said gate input port of said second error detect transistor is coupled to said first output terminal of said bistable circuit such that said second error detect transistor continuously monitors said first state stored in said bistable circuit and the inverse of said second state stored in said redundant bistable circuit and activates said source port of said first error detect transistor if equality is detected, regardless of whether the read operation, the write operation, or neither is currently being performed; said source port of said second error detect transistor is coupled to said source port of said first error detect transistor;

l. a reporting line; and m. a pull down transistor having a source port, a drain port, and a gate port wherein said source port of said pull down transistor is coupled to a power supply voltage and wherein said drain port of said pull down transistor is coupled to said reporting line and wherein said gate port of said pull down transistor is coupled to said source port of said first error detect transistor and to said source port of said second error detect transistor such that said pull down transistor forces said reporting line to said power supply voltage when said first error detect transistor activates said source port of said first error detect transistor or when said second error detect transistor activates said source port of said second error detect transistor, regardless of whether the read operation, the write operation, or neither is currently being performed.

2. An electrical apparatus for detecting errors in a memory device comprising:

a. a bistable circuit comprising a first inverter and a second inverter coupled together in a cross coupled configuration wherein an output terminal of said first inverter is a first output terminal and wherein an output terminal of said second inverter is a second output terminal, said bistable circuit storing a first data bit having a first state such that said first state is imposed on said first output terminal and the inverse of said first state is imposed on said second output terminal;

b. a redundant bistable circuit comprising a third inverter and a fourth inverter coupled together in a cross coupled configuration wherein an output terminal of said third inverter is a third output terminal and the output of said fourth inverter is a fourth output terminal, said redundant bistable circuit storing a second data bit having a second state such that said second state is imposed on said fourth output terminal and the inverse of said state is imposed on said third output terminal, said first state having a predetermined relationship with said second state, an error existing if said first state is different from said second state;

c. a first error detect transistor having a source port, a drain port, and a gate port wherein said drain port of said first error detect transistor is coupled to said fourth output terminal of said redundant bistable circuit and wherein said gate input port of said first error detect transistor is coupled to said second output terminal of said bistable circuit such that said first error detect transistor continuously monitors the inverse of said first state stored in said bistable circuit and said second state stored in said redundant bistable circuit and activates said source port of said second error detect transistor if equality is detected;

d. a second error detect transistor having a source port, a drain port, and a gate port wherein said drain port of said second error detect transistor is coupled to said third output terminal of said redundant bistable circuit and wherein said gate input port of said second error detect transistor is coupled to said first output terminal of said bistable circuit such that said second error detect transistor continuously monitors said first state stored in said bistable circuit and the inverse of said second state stored in said redundant bistable circuit and activates said source port of said first error detect transistor if equality is detected; said source port of said second error detect transistor is coupled to said source port of said first error detect transistor;

e. a reporting line; and f. a pull down transistor having a source port, a drain port, and a gate port wherein said source port of said pull down transistor is coupled to a power supply voltage and wherein said drain port of said pull down transistor is coupled to said reporting line and wherein said gate port of said pull down transistor is coupled to said source port of said first error detect transistor and to said source port of said second error detect transistor such that said pull down transistor forces said reporting line to said power supply voltage when said first error detect transistor activates said source port of said first error detect transistor or when said second error detect transistor activates said source port of said second error detect transistor.

* * * * *